the exposures in parallel, determining if an automatic payment can be made for each of the exposures and removing the automatic payment for an exposure if it can not be made while continuing processing payments for the remaining exposures.

United States Patent
Garcia et al.

(10) Patent No.: US 8,041,637 B1
(45) Date of Patent: Oct. 18, 2011

(54) SYSTEMS AND METHODS FOR AUTOMATED PAYMENT PROCESSING

(75) Inventors: Ana Maria Garcia, Shavano Park, TX (US); Zinda R. Vareed, Fair Oaks Ranch, TX (US); Pamela Glimm Diener, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/034,028

(22) Filed: Feb. 20, 2008

Related U.S. Application Data

(60) Provisional application No. 60/992,415, filed on Dec. 5, 2007.

(51) Int. Cl.
*G06Q 40/00* (2006.01)
(52) U.S. Cl. ............................................ 705/40; 705/39
(58) Field of Classification Search .................... 705/40
See application file for complete search history.

(56) References Cited

U.S. PATENT DOCUMENTS

| | | | |
|---|---|---|---|
| 6,049,773 A | 4/2000 | McCormack et al. | |
| 6,941,281 B1 * | 9/2005 | Johnson | 705/40 |
| 7,085,819 B2 * | 8/2006 | Bright et al. | 709/217 |
| 7,117,172 B1 * | 10/2006 | Black | 705/35 |
| 7,877,305 B2 | 1/2011 | Gross et al. | |
| 2002/0035488 A1 | 3/2002 | Aquila et al. | |
| 2006/0106650 A1* | 5/2006 | Bush | 705/4 |
| 2009/0144067 A1 | 6/2009 | Keefer | |
| 2010/0145734 A1 | 6/2010 | Becerra et al. | |

OTHER PUBLICATIONS

Braun, Michael, Fader, Peter S., Bradlow, Eric T., and Kunreuther, Howard; "Modeling the "Pseudodeductible" in Insurance Claims Decisions"; Management Science; Aug. 2006; pp. 1258-1272; vol. 52, No. 8.
Chung, Lawrence, Nixon, Brian A., Yu, Eric and Mylopoulos John; "Non-Functional Requirements in Software Engineering"; Contents; 2000; pp. 1 and v-viii; Kluwer Academic Publishing.
Viaene, Stijn, Derrig, Richard A., Baesens, Bart and Dedene, Guido; "A Comparison of State-Of-The-Art Classification Techniques for Expert Automobile Insurance Fraud Detection"; Journal of Risk and Insurance; 2002; vol. 69, No. 3; pp. 373-421.
"Medical Claims Software & Health Claims Payment Processing Software"; downloaded Nov. 14, 2007; http://www.impactclaims.com/; Managed Care Systems, Inc.
CyberSource; "Home : Solutions : Insurance"; downloaded Nov. 14, 2007; http://www.cybersource.com/solutions/insurance/; Copyright 2007 CyberSource Corporation.

(Continued)

*Primary Examiner* — Thomas Dixon
*Assistant Examiner* — Benjamin S Fields
(74) *Attorney, Agent, or Firm* — Schwegman, Lundberg & Woessner, P.A.

(57) ABSTRACT

Apparatus and methods to process loss payments are described herein. In one example, an apparatus includes one or more data stores, a rules engine, an audit engine and a payment engine. In another example, the method may include receiving a notice of loss, deriving a payee, processing one or more rules using the information, determining whether an automatic payment can be made and transferring funds if the automatic payment can be made. In a further example, the method may include receiving a notice of loss, the loss having one or more exposures, processing one or more rules for each of the exposures in parallel, determining if an automatic payment can be made for each of the exposures and removing the automatic payment for an exposure if it can not be made while continuing processing payments for the remaining exposures.

18 Claims, 7 Drawing Sheets

OTHER PUBLICATIONS

"U.S. Appl. No. 12/034,020, Examiner Interview Summary mailed Feb. 10, 2009", 4 pgs.
"U.S. Appl. No. 12/034,020, Final Office Action mailed Apr. 20, 2009", 15 pgs.
"U.S. Appl. No. 12/034,020, Non Final Office Action mailed Oct. 19, 2009", 12 pgs.
"U.S. Appl. No. 12/034,020, Non Final Office Action mailed Nov. 26, 2008", 9 pgs.
"U.S. Appl. No. 12/034,020, Response filed Feb. 26, 2009 to Non Final Office Action mailed Nov. 26, 2008", 14 pgs.
"U.S. Appl. No. 12/034,020, Response filed Aug. 20, 2009 to Final Office Action mailed Apr. 20, 2009", 12 pgs.
"U.S. Appl. No. 12/034,024, Examiner Interview Summary mailed Feb. 11, 2009", 4 pgs.
"U.S. Appl. No. 12/034,024, Final Office Action mailed Apr. 20, 2009", 15 pgs.
"U.S. Appl. No. 12/034,024, Non Final Office Action mailed Oct. 20, 2009", 11 pgs.
"U.S. Appl. No. 12/034,024, Non Final Office Action mailed Dec. 8, 2008", 9 pgs.
"U.S. Appl. No. 12/034,024, Response filed Feb. 3, 2009 to Non Final Office Action mailed Dec. 8, 2008", 14 pgs.
"U.S. Appl. No. 12/034,024, Response filed Aug. 20, 2009 to Final Office Action mailed Apr. 20, 2009", 13 pgs.
"U.S. Appl. No. 12/034,020, Response filed Feb. 19, 2010 to Non Final Office Action mailed Oct. 19, 2009", 9 pgs.
"U.S. Appl. No. 12/034,024, Response filed Feb. 19, 2010 to Non Final Office Action mailed Oct. 20, 2009", 9 pgs.
"U.S. Appl. No. 12/034,020, Non-Final Office Action mailed May 28, 2010", 10 pgs.
"U.S. Appl. No. 12/034,024, Non-Final Office Action mailed May 28, 2010", 10 pgs.
U.S. Appl. No. 12/034,020, Examiner Interview Summary received May 5, 2011, 3 pgs.
U.S. Appl. No. 12/034,020, Final Office Action mailed Jan. 27, 2011, 12 pgs.
U.S. Appl. No. 12/034,020, Notice of Allowance mailed May 27, 2011, 14 pgs.
U.S. Appl. No. 12/034,020, Response filed Apr. 27, 2011 to Final Office Action mailed Jan. 27, 2011, 9 pgs.
U.S. Appl. No. 12/034,020, Response filed Nov. 29, 2010 to Non Final Office Action mailed May 28, 2010, 9 pgs.
U.S. Appl. No. 12/034,024, Non Final Office Action mailed May 25, 2011, 13 pgs.
U.S. Appl. No. 12/034,024, Response filed Nov. 29, 2010 to Non Final Office Action mailed May 28, 2010, 10 pgs.
U.S. Appl. No. 12/034,040, Final Office Action mailed Jan. 27, 2011, 12 pgs.

* cited by examiner

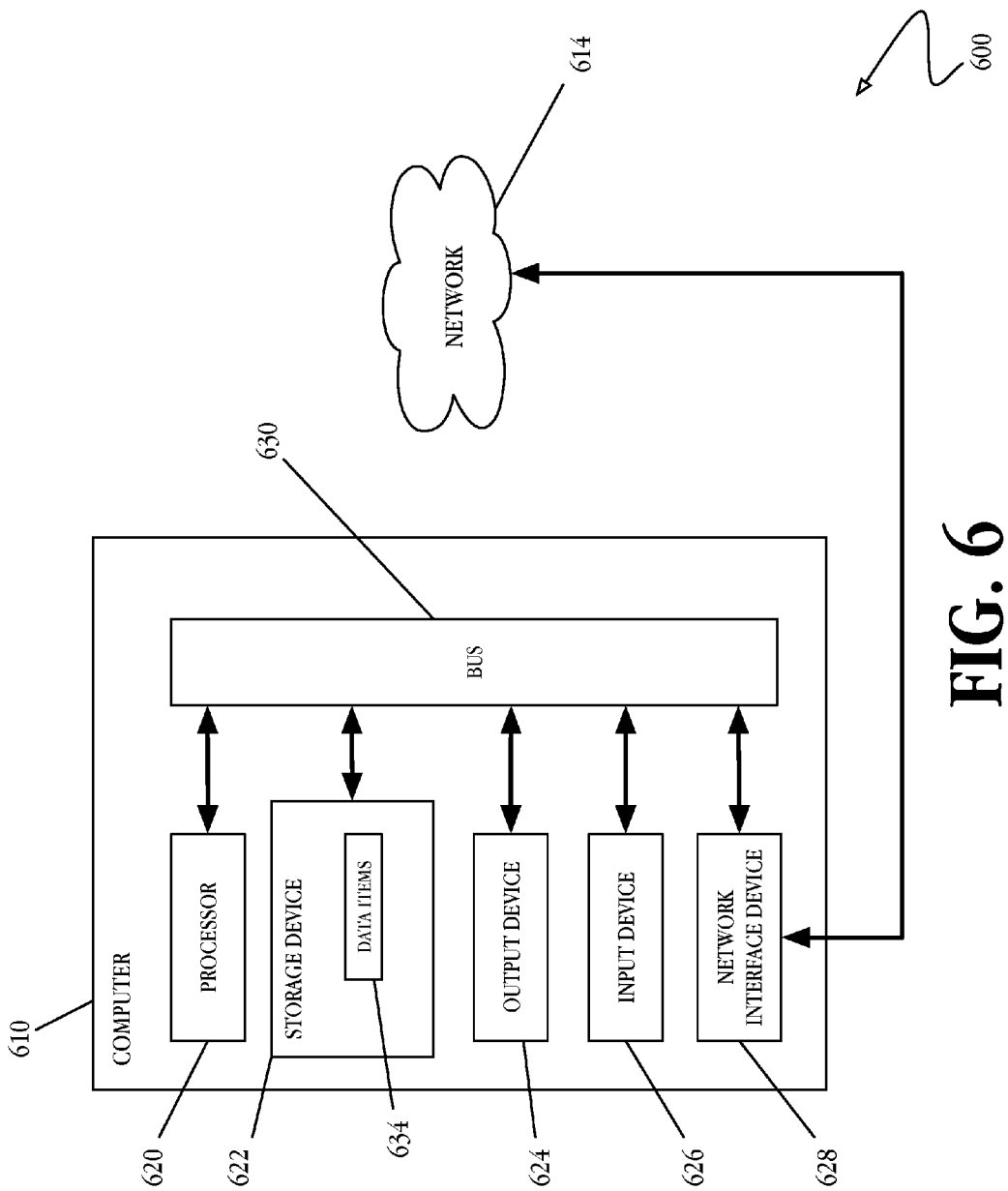

SYSTEMS AND METHODS FOR AUTOMATED PAYMENT PROCESSING

RELATED APPLICATIONS

This disclosure is related to pending U.S. patent application Ser. No. 12/034,020, titled "SYSTEMS AND METHODS FOR AUTOMATED PAYMENT PROCESSING," and U.S. patent application Ser. No. 12/034,024, titled "SYSTEMS AND METHODS FOR AUTOMATED PAYMENT PROCESSING," filed on an even date herewith. Further, the present application claims the benefit of U.S. Provisional Application No. 60/992,415 filed Dec. 5, 2007; said application is hereby incorporated herein by reference in its entirety.

TECHNICAL FIELD

This application relates to systems and methods that process payments and more particularly to systems and methods that provide for automated payment processing.

BACKGROUND

Customers demand more from the products and services they use than ever before. They insist that the companies they deal with on a regular basis provide them greater and greater levels of information and access. These companies are configuring and operating more and more complex systems that are capable of delivering highly integrated services to those customers.

For example, a customer that has an insurance policy with a company that covers their automobile expects to have quick resolutions when they are involved in an accident. Lengthy processing times and numerous conversations between the customer and the company can result in a lost customer. However, each auto accident, or loss, is unique and requires individualized attention. This aspect of auto accidents is of little consequence to the customer who will make no allowances for the thousands of insurance claims that may be processing at the same time as theirs. All they experience is a lengthy process and very little satisfaction during a particularly traumatic time in their lives.

SUMMARY

In an embodiment, an apparatus to provide automated payments includes one or more data store, a rules engine to process one or more rules related to a loss, an audit engine to provide one or more audit functions and a payment engine. The apparatus may additionally include, in further embodiments, a medical claims processor to provide audit functions related to first party medical losses. In yet another embodiment, the rules engine is configured to derive a context for rules processing from the information.

In an embodiment, a method of processing loss payments includes receiving a notice of loss, deriving a payee, processing one or more rules, determining whether an automatic payment can be made and transferring funds if an automatic payment can be made. In a further embodiment, deriving the payee may include determining coverage and liability for the loss and deriving the payee, where the payee includes at least one entity.

In an embodiment, a method of processing payments for a loss includes receiving a notice of loss, deriving each of the exposures, processing, in parallel, one or more rules, determining whether an automatic payment can be made, and removing an exposure from automatic payment while processing payments for the remaining exposures.

BRIEF DESCRIPTION OF THE DRAWINGS

Embodiments are illustrated by way of example and not limitation in the figures of the accompanying drawings, in which like references indicate similar elements and in which:

FIG. 6 shows a block diagram of a machine including instructions to perform any one or more of the methodologies described herein.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Overview

Figure 1:
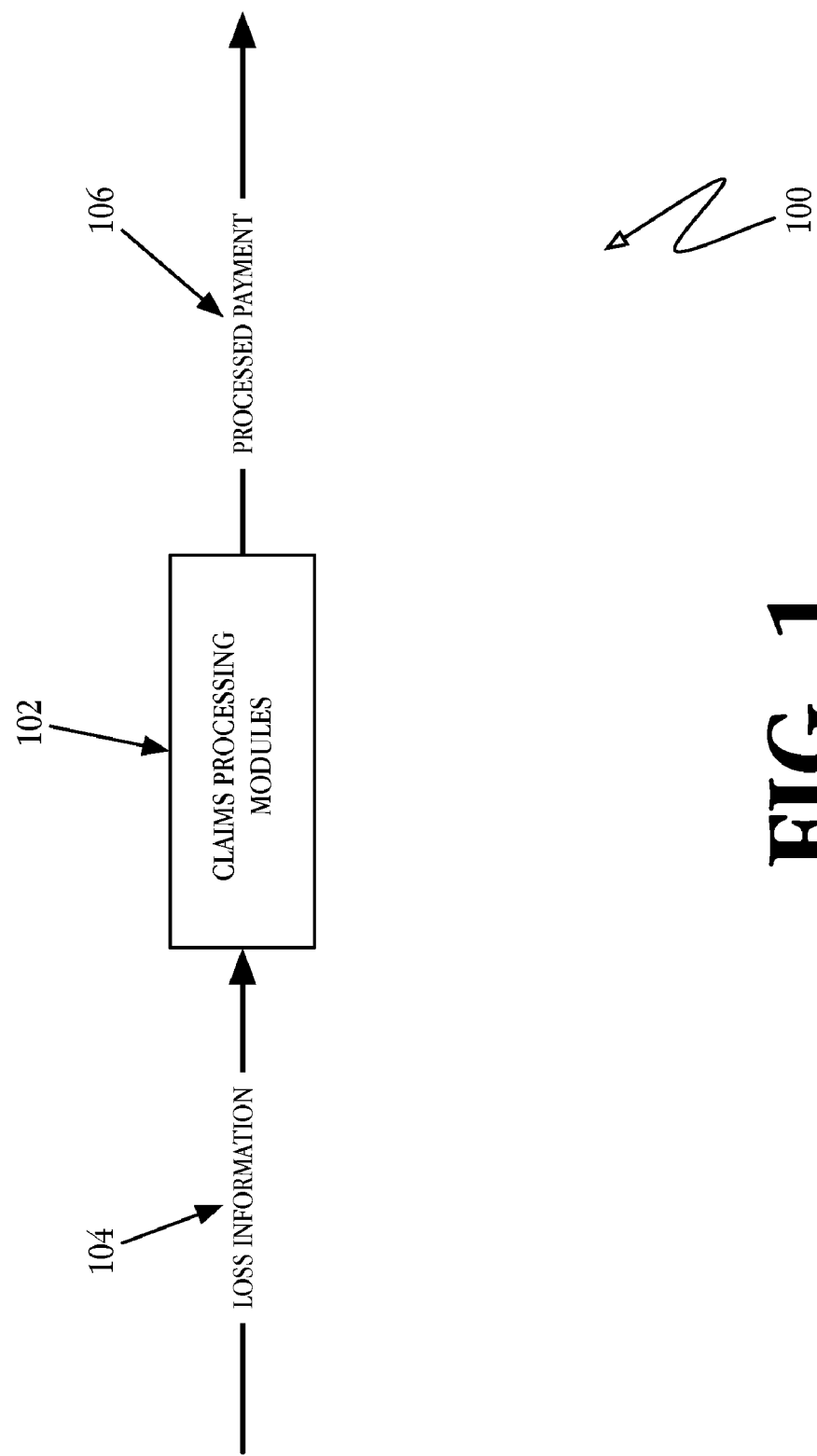
FIG. 1 shows a high-level block diagram of a system for providing payment processing, in accordance with an example embodiment.

FIG. 1 shows a high-level block diagram of a system for providing payment processing, in accordance with an example embodiment. In an embodiment, the system 100 includes one or more claims processing modules 102. The claims processing modules 102 receive loss information 104, through any suitable means and output a processed payment 106.

The loss information 104 includes all information related to an insured loss. In an embodiment, the insured loss is due to an automobile accident. The party insured by the operator of the system 100 described here reports the loss to the operator, who in turn begins to process the loss. One possible result from this processing, also called claims processing, is that the insured party receives some payment for their loss, which may include up to total replacement value for their loss. One or more provisions in the insurance policy, such as a deductible, may modify the amount of payment. It may also be modified by the insured party's fault in this particular incident. This latter modification can be governed by restrictions in specific jurisdictions, such as no-fault jurisdictions where, regardless of who is at fault for the accident, each company insuring each vehicle involved covers the loss to that particular vehicle.

The processed payment 106 includes any distribution of monies to the insured party and may include an electronic transfer of funds through any suitable means, or a physical check being drafted and delivered to the insured party. In one example, the processed payment may include instructions to an electronic payment engine that are intended to cause the electronic payment engine to effect the electronic transfer.

Overall, the system 100 here is initiated when the company is made aware of a loss involving a vehicle that is insured by them. This may include a phone call from the insured party at the scene of an accident. Other means of notification may be used, such as electronic sensors in the vehicle that are configured to collect information regarding accidents and to transmit that information directly to the company. In this latter example, the processing could begin without initiation by the insured, but may involve additional information collection from the insured, or the insured's representatives.

In an auto accident, which collectively may be called a loss, there may be more than one discrete loss or claimable loss involved. Each of these are known as exposures, as they each expose the insurance company to an insurance liability which they may have to pay on. For instance, in a single car accident, where there is a driver and a passenger in the vehicle, there would be three exposures, at a minimum. The vehicle would be the first exposure, with the driver and passenger each being an additional exposure. If the vehicle struck some structure or parked vehicle, there may be additional exposures. The claims processing module 102 described herein, in an embodiment, is configured to process each of the exposures discretely and in parallel. If one or more of the exposures requires human intervention, those exposures may be removed from automatic processing, while the other exposures continue to be operated on by automatic processes, without further human intervention.

Reference is made here to auto accidents and auto claims, though the application may not be limited to just those. The apparatus and methods described in the present application have equal applicability to other types of insurance losses.

Systems

Figure 2A:
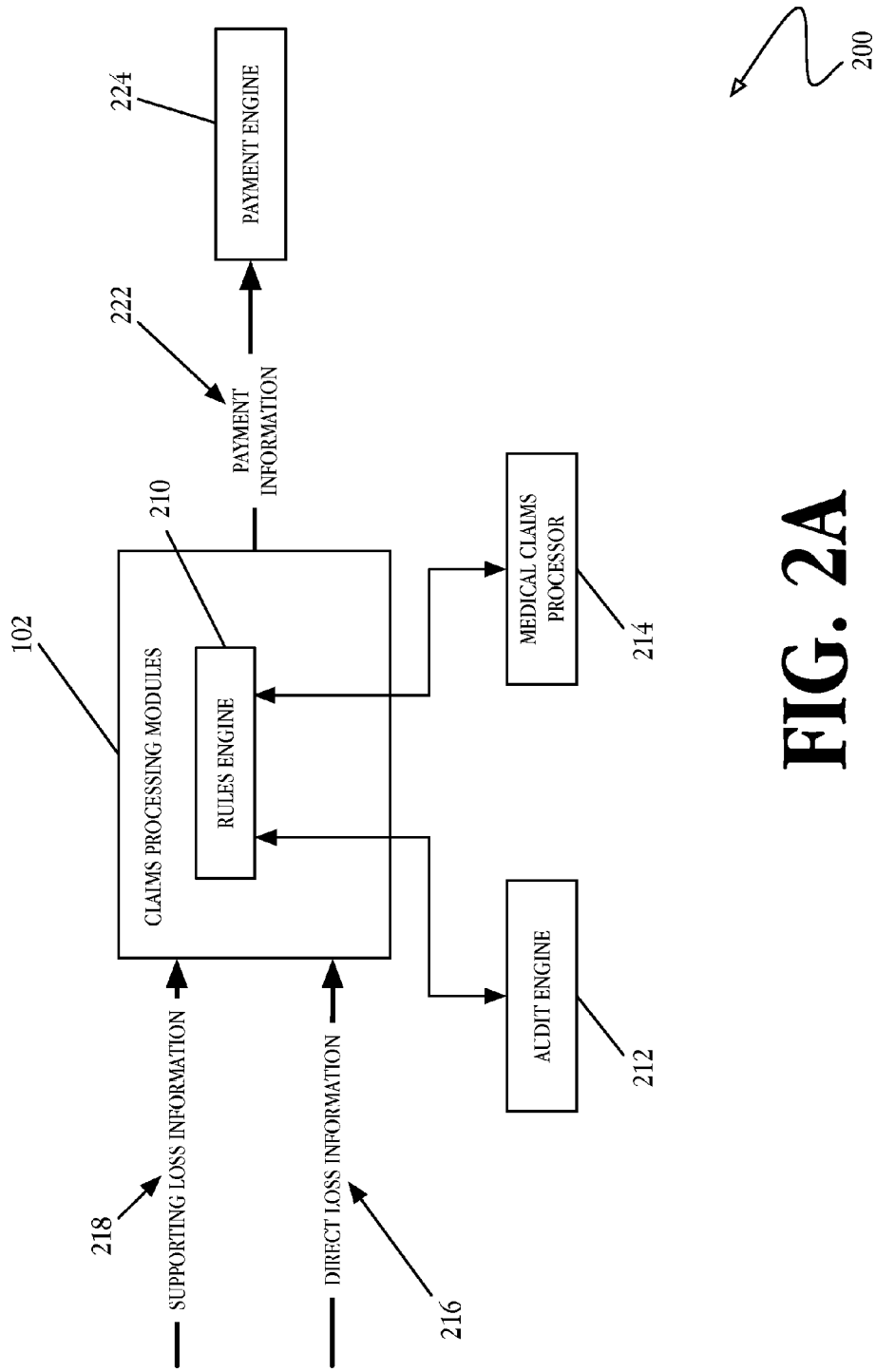
FIG. 2A shows a more detailed block diagram of an apparatus for providing payment processing, in accordance with an example embodiment.

FIG. 2A shows a more detailed block diagram of an apparatus for providing payment processing, in accordance with an example embodiment. In an embodiment, the apparatus 200a includes one or more claims processing modules 102, including at least a rules engine 210. The rules engine 210 is communicatively coupled, in one embodiment, to an audit engine 212 and a medical claims processor 214. The claims processing module 102 receives direct loss information 216 and supporting information 218 through any suitable means. The claims processing modules 102 output payment information 222 that can be sent, in one example, to a payment engine 224.

Loss information 104 as described above may include direct loss information 216 and supporting information 218. As used herein direct loss information 216 is information specific to a particular accident, or loss. This may include a listing of all vehicles and persons involved in the accident, the physical specifics of the accident, and the like. These are only examples, and are not meant as an exhaustive list. Broadly, supporting information 218 is information that has equal applicability to more than one accident involving the insured, whereas direct loss information has applicability to only one of those one or more accidents.

In an embodiment, the rules engine 210 is configured to receive information and to process one or more rules related to the loss to derive a payment for the loss. In one example, the information is retrieved from one or more data stores. The one or more rules processed by the rules engine 210, in one embodiment, represent decisions to be made using the data. This may include simple fraud detection, such as checking the average cost to repair a damaged bumper with the estimate to repair the bumper in a present case. It may also include checking the insurance policy of the present vehicle to see if the total amount of the damage is covered under the policy. Other decisions may include, without limitation, determining if the deductible has been applied yet.

In an embodiment, the audit engine 212 is configured to provide one or more audit functions to the rules engine. These audit functions include any function that is configured to check the accuracy of the processes already completed. The audit engine 212 may also provide decision making, or rules processing to the rules engine 210, in some examples. In such an arrangement, the rules engine 210 could process some rules internally, and pass some decision or rule processing to the audit engine 212, which would then either return completed results or a result that indicates to the rules engine that this particular loss requires human intervention. In yet another embodiment, the audit engine 212 is configured to provide audit functions only where the loss being paid on is a physical damage loss. In this arrangement, the audit engine 212 only operates on physical damages, with other processing modules, such as the medical claims processor 214, performing operations intended to verify and audit other types of damages, such as 1st party medical claims to other processing modules. As used herein, first party medical claims are those medical claims for passengers in the vehicle covered. For instance, in a two-car accident, where each car has two occupants, driver and passenger, and where coverage is for the first car, the passenger and driver in the first car would be covered as a first party medical claim. The driver and passenger in the second car would be considered second party medical claims. The insurance company operating the apparatus as described herein processes first party medical claims.

In an embodiment, the medical claims processor 214 is configured to provide one or more audit functions related to first party medical losses to the rules engine 210. In one example, the medical claims processor 214 may be operated by the same entity that operates the rules engine 210. In an alternate example, the medical claims processor 214 may be operated by a wholly separate entity. The latter example may be advantageous as audit rules for medical claims and payment decisions can be greater opportunities for fraud by claimants.

In an embodiment, the payment engine 224 receives the payment information and processes a payment according to the payment information. This may include an electronic funds transfer, which can be either a wire transfer, or an Automated Clearing House (ACH) transaction. It may also include drafting and issuing a physical check that is sent to the payee defined by the payment information.

Figure 2B:
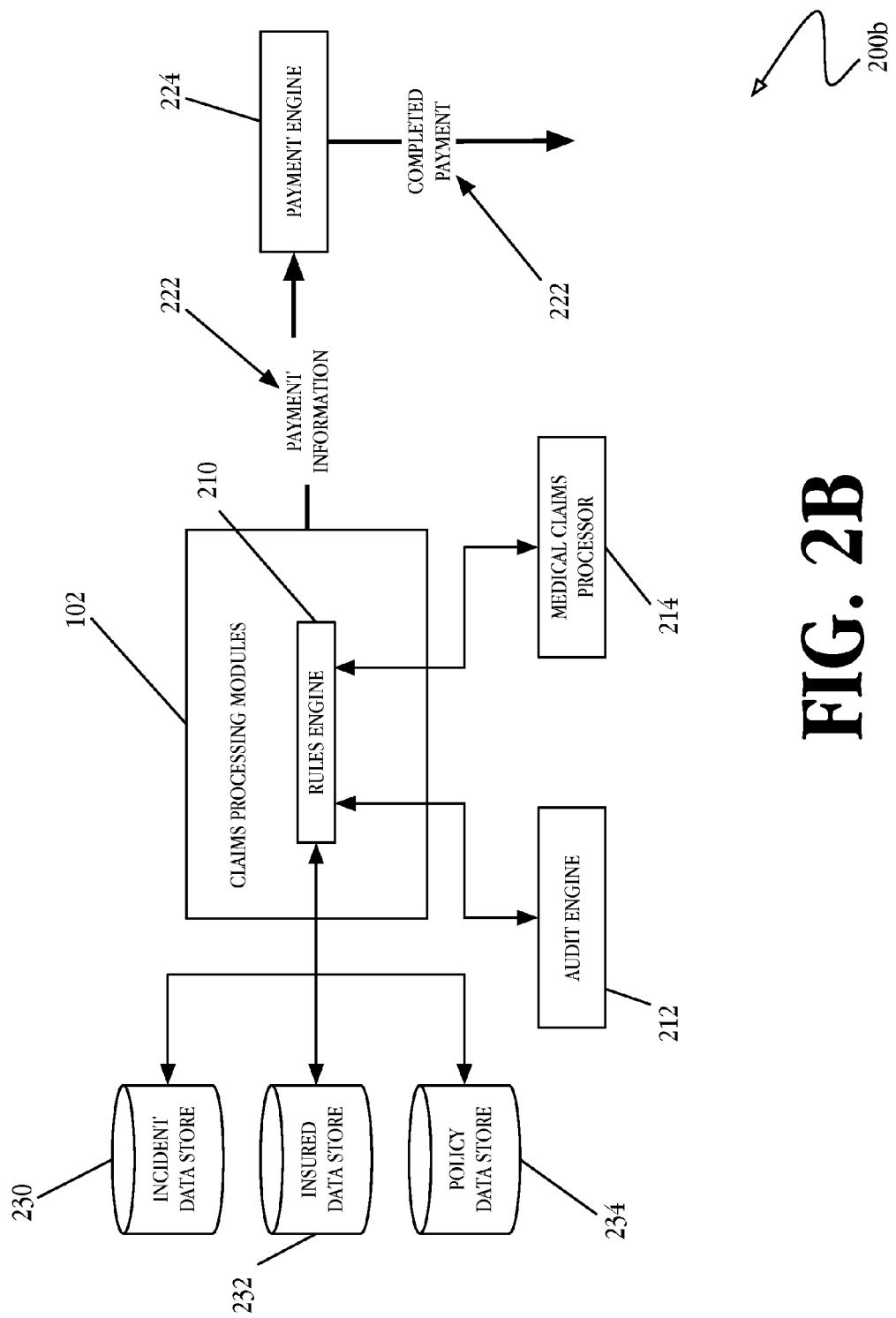
FIG. 2B shows a more detailed block diagram of an apparatus for providing payment processing, in accordance with an example embodiment.

FIG. 2B shows a more detailed block diagram of an apparatus for providing payment processing, in accordance with an example embodiment. In an embodiment, the apparatus 200b is similar to the apparatus 200a described above with respect to FIG. 2A, with the addition of one or more data stores that maintain information related to the loss. These one or more data stores may include an incident data store 230, a first party data store 232 and a policy data store 234.

In an embodiment, each of the data stores information that is related to the loss. The incident data store 230, in this example, maintains information related to the specific properties of the loss. Those properties include information that is applicable only to the loss itself and has no applicability to other losses. Such properties may include, without limitation, damage to each of the vehicles involved, estimates to repair each of the vehicles, medical injuries sustained by the people impacted by the accident, weather data for the location of the accident, and the like.

The Insured Data Store 232, in this example, maintains information about the insured party involved in the loss. This may be the driver or owner of the vehicle involved in the loss. The insured data store 232 maintains information that would have equal applicability to any accident involving that vehicle, such as personal information.

The policy data store 234, in this example, maintains policy specific information that may modify coverage amounts for the loss. For example, an insurance policy for a vehicle can be tailored to the needs of the insured party by modifying coverage, coverage levels, deductibles and the like. For instance, bodily injury claims may be capped per person and per accident, such as $50,000 per person and $100,000 per accident. In this example, bodily injury claims will be covered up to that amount and not over. The insured data store 232 and policy data store 234 may be combined into a single data store, as coverage amounts, for example, are individualized. However, the policy data store 234 may also contain information about regulatory requirements for jurisdictions where the accident occurred.

In a further embodiment, the rules engine 210 is configured to derive a context using the information retrieved from the one or more data stores. This context provides the rules engine the ability to process similar data differently given a present operation. A simple example can be shown with the difference between a single car accident and a multiple car accident. Though damage to the car may be quantified similarly, the processing of that damage information will be markedly different in a single car accident, than in a multiple car accident. The rules engine 210 can derive context such as this from the information. Additionally, once derived, it provides an identification of further data possibly needed for downstream processing by the rules engine 210, in one example. Once the data needed is identified, the rules engine 210 is configured to fetch, or retrieve, that data prior to operations that directly need it. In a further embodiment, while retrieving information from the one or more data stores, the rules engine 210 queries the data store for the availability of zero-cost data. Zero-cost data, as used herein, is data contained within a record that was not explicitly requested, but that can be retrieved within that request. An example of this may be the age of one of the passengers, which is contained within the incident data store, but was not requested. The rules engine 210 is configured to retrieve this zero-cost data, which may or may not be used during some future operation.

Methods

Figure 3:
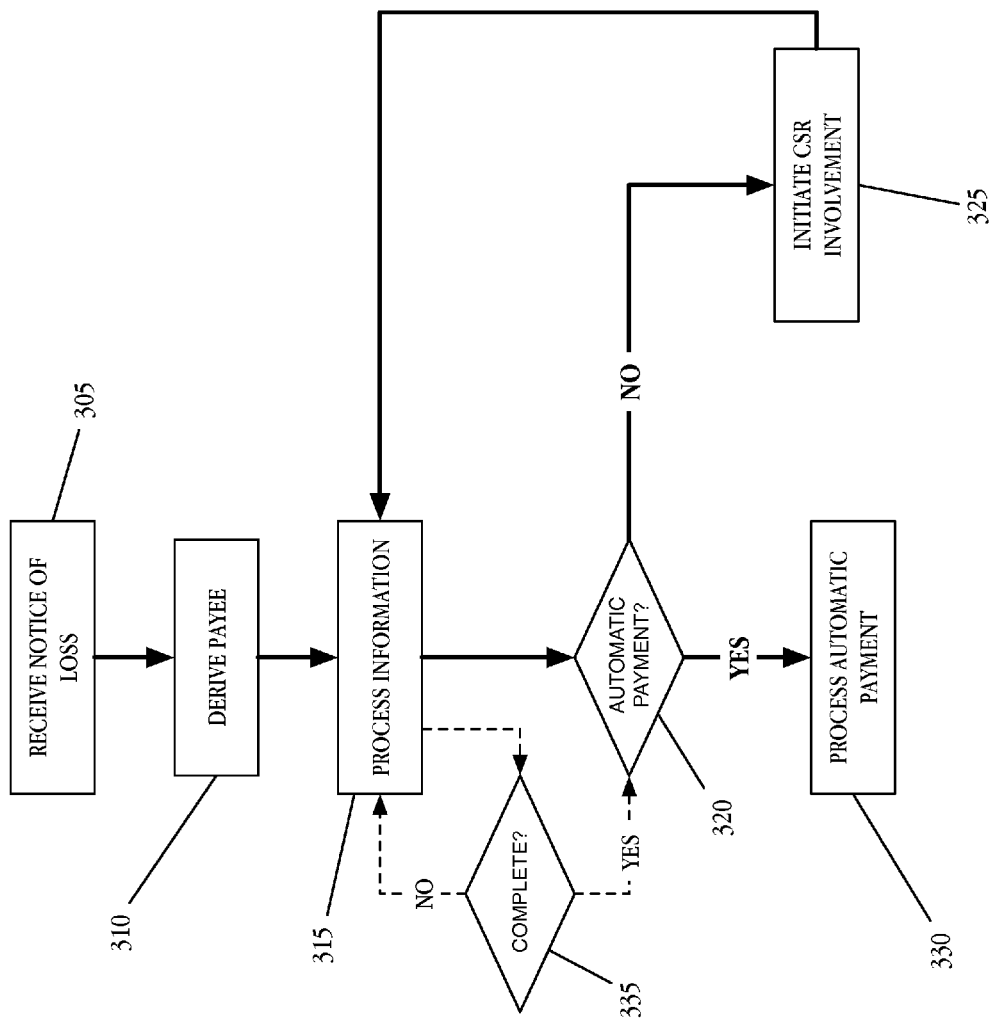
FIG. 3 shows a flowchart of a method for providing automated payment processing, in accordance with an example embodiment.

FIG. 3 shows a flowchart of a method for providing automated payment processing, in accordance with an example embodiment. The operations depicted in FIG. 3 can be carried out on the apparatus described above with respect to FIGS. 2A and 2B, in some examples.

At block 305, the apparatus receives a notice of loss. As discussed above, this typically follows a communication from the insured that an accident has occurred, but the methods described here are not limited to only such notices. The notice of loss, or accident report, contains information that is related to the accident. In one embodiment, the information is received as a set of fielded data. In an alternate embodiment, the information is received and is parsed using any suitable means to obtain individual data points. One example would be receiving a person's full name as "John Q. Doe" and parsing that into first name, middle initial, and last name.

At block 310, the apparatus derives a payee. The payee as used herein is an entity that will be paid some amount during resolution of the loss. This may include an auto repair shop, the car's owner, medical providers and the like. For each exposure within a loss there may be multiple payees. This is especially true, though not exclusively so, with first party medical claims, which may involve many multiple medical providers.

At block 315, one or more rules are processed using the information. The rules, in one example, are business logic rules and decision points that are processed by the rules engine 210 described above. The rules engine 210 can, in some examples, utilize an audit engine 212 for physical damage claims and a medical claims processor 214 for medical claims. In the latter, the medical claims can be categorized as either first party (persons within the vehicle covered), or second party (persons not in the vehicle covered). The processing of the rules at block 315 provides the rules engine 210 the ability to decide at block 320 whether an automatic payment can be made. In accidents where there are no abnormalities or aberrations in the data when processed, the claim can be automatically processed, without further human intervention and a payment made. There may be some cases where the automatic payment cannot be made for any variety of reasons, such as suspected fraud, or incomplete information regarding the payee or the accident. In these cases, a customer service representative (CSR) is involved at block 325 for further processing. This may involve any number of operations that are outside the scope of the present discussion. If the operations can be completed and resolved, the CSR can return this particular payment for further automatic processing and payment. One example might be where the payee details are incomplete. The CSR at block 325 would investigate the missing data and provide that data back to the incident data store 230, and return operations to block 315.

Additionally, a CSR may, upon their own initiative, provide instructions to the apparatus to have the claim removed from automatic processing. This may be due to any number of reasons. Through this operation, the expertise of the CSR can be leveraged to detect fraud or claims that are out of the ordinary. It may also allow the operator of the apparatus to provide a quality check on the automatic operations.

If, at block 320, an automatic payment can be made, the payment is processed at block 330. This may include any suitable means, such as a wire transfer, ACH transaction, or check issuance, but is not limited to just these means. Any method of transferring funds from one entity to another is considered to be within the scope of the present discussion.

The operations at block 315 may be performed over a period of time as information is obtained from many sources. Within the context of an auto accident, damage estimates; and medical diagnosis are all types of follow-up inquiries that may be needed to further processing. As shown in FIG. 3, at block 335, a determination as to the completeness of the file may be made, in some examples. In such an arrangement, the flow of operations would proceed from block 315 to block 335. Only if the file were complete, as determined at block 335, could operations proceed to block 320 to determine if an automatic payment can be made. This continuous loop from block 315 to block 335 could be processed daily to query for more data, in some examples. In alternate examples, a CSR may be tasked with investigating insurance claims that have not had any processing done on them by the apparatus described here.

In a further embodiment, following the processing of the automatic payment at block 330, the apparatus may additionally issue instructions to a financial system to release any reserved funds. Reserved funds, as used herein, are funds that are set aside when a loss is first reported, and are intended to cover the entirety of the loss. Only when the claim has been finally resolved can those reserved funds are released back to the general reserve that is maintained by the insurance company.

Figure 4:
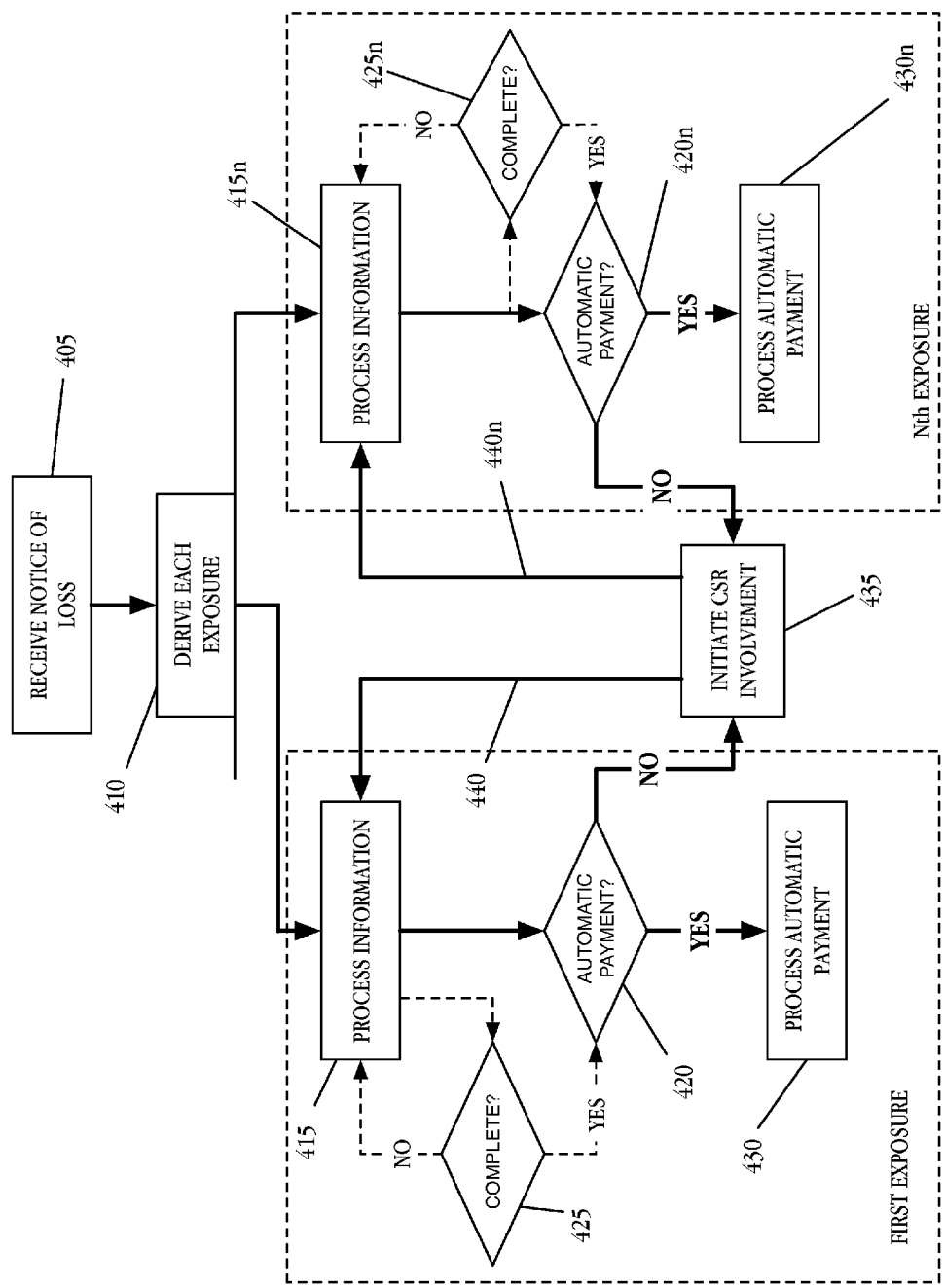
FIG. 4 shows a flowchart of a method for providing automated payment processing, in accordance with an example embodiment.

FIG. 4 shows a flowchart of a method for providing automated payment processing, in accordance with an example embodiment. The operations depicted in FIG. 4 can be carried out by an apparatus as described above with respect to FIG. 2A and FIG. 2B, in one embodiment.

At block 405, the apparatus receives a notice of loss. As discussed above, this may be a notification from an insured regarding an accident, or any other types of notices. At block 410, each of the exposures are derived. Exposures represent discrete portions of the insurance claim that can be processed separately. For each of the exposures, the operations are described at blocks 415 through 430 and blocks 415n through 430n. The operations shown at blocks 415n through 430n represent the second through nth exposures derived at block 410.

At block 415, the apparatus processes one or more rules using the information received with the notice of loss, and further information as that information comes available. Further information includes information obtained after the incident and the notice of loss such as damage estimates, and the like, which have been discussed above.

At block 420, in one embodiment, the apparatus determines if an automatic payment can be made for the exposure being processed. In an alternate embodiment, operations pass to block 425 to determine if the processing for the exposure is complete. If processing is not complete, operations return to block 415. If processing is complete, operations pass to block 420 to determine if an automatic payment can be made. If an automatic payment can be made, as determined at block 420, the payment is processed at block 430. If the automatic payment cannot be made, operations pass to block 435 where a CSR's involvement is initiated. This decision point may also be performed as the file is checked for completeness, in the alternate embodiment, so errors and inconsistencies can be resolved when they are first uncovered.

As shown in FIG. 4, additional exposures are processed in parallel, and the operations performed are substantially similar to the operations performed on the first exposure. The CSR involvement initiated at block 435 may, in some examples be a single CSR. However, in alternate examples, any CSR may access the file as needed to perform operations to further the processing of the claim.

In a further embodiment, the operations performed at blocks 415, 420 and 425 may be discretely identified and tracked in a suitable work progress application. In some examples, discrete work items can be displayed to the insured through a web browser interface. This can allow the insured to resolve issues themselves before involvement by a CSR is initiated. Information may be obtained from the insured that is considered sufficient to alter the status of the work item. An example of such altering is a work item that, for instance, requires a statement from the insured. The insured could create a document for their statement and upload that document through the web browser, which would then alter the status from pending to completed in this example. Other types of status tracking can be used, and altering the status is not limited to changing from pending to completed.

Example Implementations

Figure 5:
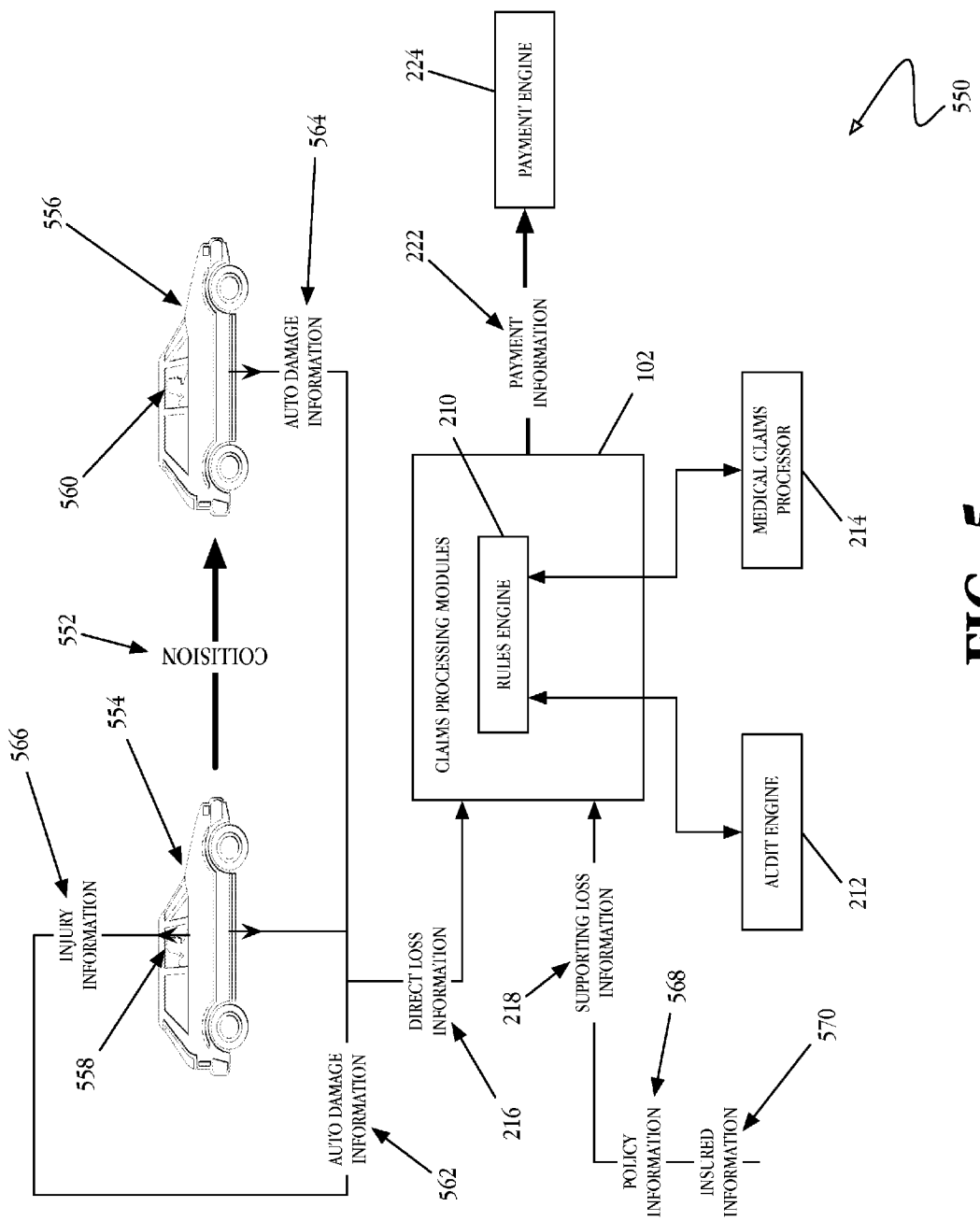
FIG. 5 shows a block diagram of an example system that provides automated payment processing, in accordance with an example embodiment.

FIG. 5 shows a block diagram of an example system that provides automated payment processing, in accordance with an example embodiment. The system 500 shown in FIG. 5 depicts an example of the systems and methods previously described. Shown is a collision 552 between a first vehicle (an insured vehicle 554) and a second vehicle (a claimant vehicle 556). In this example, the insured vehicle 554 has struck the claimant vehicle 556 from behind, otherwise known as a rear-end collision. Absent extraordinary circumstances, the first vehicle in a rear-end collision is 100% at fault, which will be assumed in this example.

Following the collision 552, information will be obtained for both the insured vehicle 554 and the claimant vehicle 556. In addition, information regarding injuries for each of an insured driver 558 and a claimant driver 560. For this example, only the insured driver 558 has sustained medical injuries. For the purposes of this insurance claim, insured vehicle auto damage information 562 and claimant vehicle auto damage information 564 is collected. This may be done using any suitable methods, such as insurance adjusters, repair shop estimates, photo analysis, and the like. These are only meant as examples, and any method of acquiring auto damage information, known or unknown, is considered to be within the scope of the present discussion. Additionally, injury information 566 is obtained for the insured driver 558. Injury information may be obtained through any suitable method, such as medical reports, medical investigation, and the like. These are only meant as examples, and any method of acquiring injury information, known or unknown, is considered to be within the scope of the present discussion. The insured vehicle auto damage information 562, the claimant vehicle auto damage information 564 and the injury information 566 are collectively known as direct loss information 216 as discussed above. In addition to the direct loss information 216, supporting loss information 218 is obtained from policy information 568 and insured information 570.

Both the direct loss information 216 and the supporting loss information 218 are processing by the rules engine 210 of the claims processing module 102 as discussed above. This information may be obtained at the time of the collision 552 or at some time after. The claims processing module 102 is configured, in some examples, to request information from information sources such as, medical providers, involved parties, and repair providers. The claims processing module 102 can also be configured to receive, without request, information from those sources. The operations performed by the rules engine 210 of the claims processing module 102 begin with the first notice of loss, and can proceed without further human intervention. The operations may be interrupted by customer service representatives during processing if they feel that fraud may be occurring, or if the automated operations needed to support the processing of the rules engine 210 require further information not obtainable through these automated means.

The rules engine 210, through interaction with the audit engine 212 and the medical claims processor 214 can process, without human intervention, the direct loss information 216 and the supporting loss information 218 to output the payment information 222. This payment information may include, without limitation, instructions intended to cause payment to any of the providers of repairs for the vehicles. Additionally, the instructions may effect payment to one or more medical providers providing medical care to the insured driver. As discussed above, these operations can proceed from first notice of loss to the processing of the payment information 222 by the payment engine 224.

FIG. 6 shows a block diagram of a machine including instructions to perform any one or more of the methodologies described herein. A system 600 includes a computer 610 connected to a network 614. The computer 610 includes a processor 620, a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which are outside the scope of the present discussion.

Although the controller and the data items 634 are shown to be within the storage device 622 in the computer 610, some or all of them may be distributed across other systems, for example on a server and accessed via the network 614.

The output device 624 is that part of the computer 610 that displays output to the user. The output device 624 may be a liquid crystal display (LCD) well known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer implemented method comprising: using a processor in a system including at least one subsystem having a computing device with the processor and memory for storing executable instructions that are executable by the processor to perform: receiving a notice of a loss in a computer system, wherein the notice of the loss includes information contained in one or more fields and the loss involves more than one exposure; deriving each of the more than one exposures from the information received in the computer system and stored at a data store, where each exposure may independently expose an insurance company to liability, and wherein the data store includes at least one of the following: an incident data store that maintains information related to specifics of the loss; an insured data store that maintains information about an insured party involved in the loss; and a policy data store that maintains policy specific information that may modify coverage amounts for the loss; processing, in parallel, for each of the more than one exposures, one or more rules using the information in the computer system to derive a context of the loss; determining, using the one or more rules in the computer system, whether an automatic payment can be made to a payee for each of the more than one exposures based on the context of the loss, wherein the automatic payment can be made if the processed information passes one or more audit functions including verifying an accuracy of a payment of an exposure; and removing an exposure from an automatic payment when the one or more rules provide that an automatic payment cannot be made with the computer system while processing an automatic payment for an exposure when the one or more rules provide that an automatic payment can be made with the computer system.

2. The method of claim 1, further including instructions that are executable by the processor to perform:
displaying a status of each of in-process work items in a web browser to an insured; and
receiving, from the insured, information sufficient to alter the status of at least one of the in process work items.

3. The method of claim 1, further including instructions that are executable by the processor to perform:
parsing from the information a payee for the exposure.

4. The method of claim 3, further including instructions that are executable by the processor to perform:
processing an automatic payment if an automatic payment can be made, wherein processing an automatic payment includes at least one of the following: wire transfer to the payee, automated clearing house (ACH) transaction to the payee, and issuing a physical check that is delivered to the payee.

5. The method of claim 1, including instructions that are executable by the processor to perform:
processing, in parallel for each of the one or more exposures, one or more rules using the information contained in one or more fields and information retrieved from one or more data stores.

6. The method of claim 5, wherein the one or more data stores maintain information directly related to the loss and information indirectly related to the loss.

7. A machine-readable medium having computer executable code tangibly embodied thereon that processes payments for a loss on a computer system that executes the code and performs the following operations: receiving a notice of a loss in the computer system, wherein the notice of the loss includes information contained in one or more fields and the loss involves more than one exposure; deriving each of the more than one exposures from the information received in the computer system and stored at a data store, where each exposure may independently expose an insurance company to liability, and wherein the data store includes at least one of the following: an incident data store that maintains information related to specifics of the loss; an insured data store that maintains information about an insured party involved in the loss; and a policy data store that maintains policy specific information that may modify coverage amounts for the loss; processing, in parallel, for each of the more than one exposures, one or more rules using the information to derive a context of the loss; determining, using the one or more rules in the computer system, whether an automatic payment can be made to a payee for each of the more than one exposures based on the context of the loss, wherein the automatic payment can be made if the processed information passes one or more audit functions including verifying an accuracy of a payment of an exposure; and removing an exposure from an automatic payment when the one or more rules provide that an automatic payment cannot be made with the computer system while processing an automatic payment for an exposure when the one or more rules provide that an automatic payment can be made with the computer system.

8. The machine-readable medium of claim 7, wherein processing includes:
displaying a status of each of in-process work items in a web browser to an insured; and
receiving, from the insured, information sufficient to alter the status of at least one of the in process work items.

9. The machine-readable medium of claim 7, wherein processing the automatic payment includes:
parsing from the information a payee for the exposure.

10. The machine-readable medium of claim 9, further comprising:
processing an automatic payment if an automatic payment can be made, wherein processing an automatic payment includes at least one of the following: wire transfer to the payee, automated clearing house (ACH) transaction to the payee, and issuing a physical check that is delivered to the payee.

11. The machine-readable medium of claim 7, wherein processing includes:
processing, in parallel for each of the one or more exposures, one or more rules using the information contained in one or more fields and information retrieved from one or more data stores.

12. The machine-readable medium of claim 11, wherein the one or more data stores maintain information directly related to the loss and information indirectly related to the loss.

13. A computer implemented system for processing payments for a loss, the system comprising at least one subsystem having a computing device with a processor and memory for storing executable instructions that are executable by the processor to: receive a notice of a loss in a claims processing module of the computer implemented system, wherein the notice of the loss includes information contained in one or more fields and the loss involves more than one exposure; derive each of the more than one exposures from the information received in the claims processing module of the computer system and stored at a data store, where each exposure may independently expose an insurance company to liability, and wherein the data store includes at least one of the following: an incident data store that maintains information related to specifics of the loss; an insured data store that maintains information about an insured party involved in the loss; and a policy data store that maintains policy specific information that may modify coverage amounts for the loss; process, in parallel, for each of the more than one exposures, one or more rules using the information in a rules engine of the computer system to derive a context of the loss; determine, using the one or more rules in the rules engine of the computer system, whether an automatic payment can be made to a payee for each of the more than one exposures based on the context of the loss, wherein the automatic payment can be made if the processed information passes one or more audit functions including verifying an accuracy of a payment of an exposure; and remove an exposure from an automatic payment when the one or more rules provide that an automatic payment cannot be made with the computer system while processing an automatic payment for an exposure when the one or more rules provide that an automatic payment can be made with the computer system.

14. The system of claim 13, including executable instructions that are executable by the processor to:
display a status of each of in-process work items in a web browser to an insured; and
receive, from the insured, information sufficient to alter the status of at least one of the in process work items.

15. The system of claim 13, including executable instructions that are executable by the processor to:
parse from the information a payee for the exposure.

16. The system of claim 15, further comprising executable instructions that are executable by the processor to:
process an automatic payment if an automatic payment can be made, including at least one of the following: wire transfer to the payee, automated clearing house (ACH) transaction to the payee, and issuing a physical check that is delivered to the payee.

17. The system of claim 13, including executable instructions that are executable by the processor to:
process, in parallel for each of the one or more exposures, one or more rules using the information contained in one or more fields and information retrieved from one or more data stores.

18. The system of claim 17, wherein the one or more data stores maintain information directly related to the loss and information indirectly related to the loss.

* * * * *